(No Model.)
L. R. FAUGHT
BORING BAR.
No. 255,846. Patented Apr. 4, 1882.
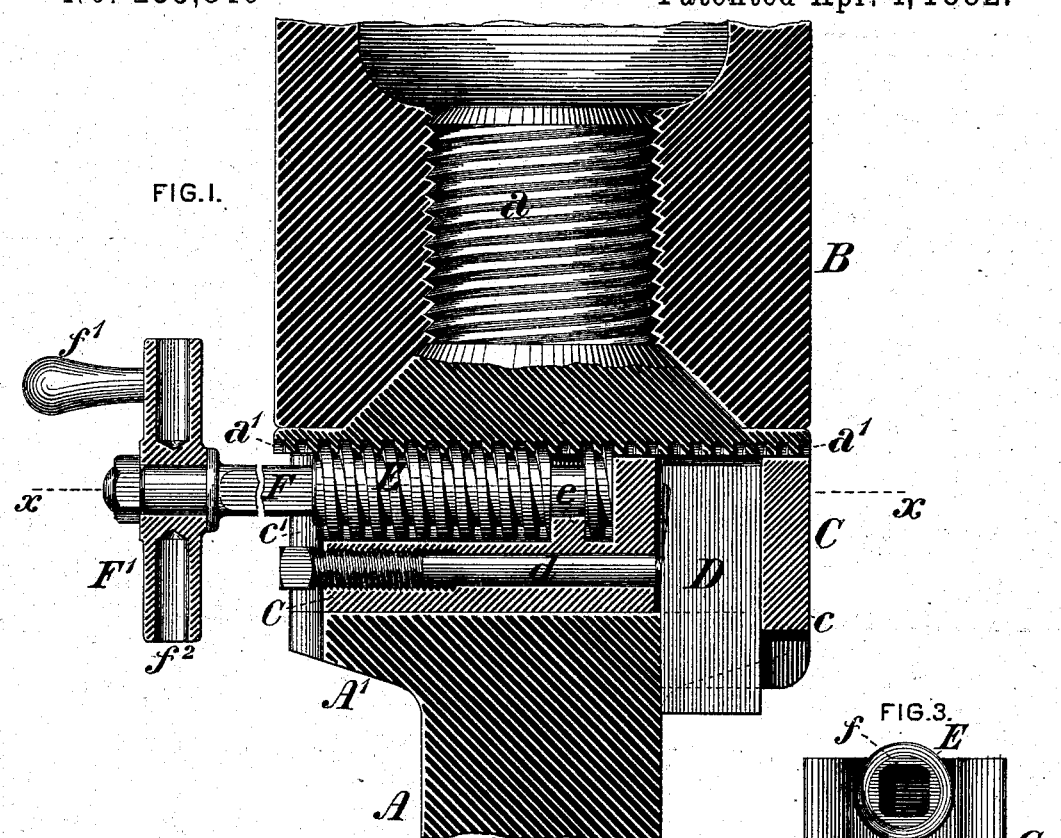
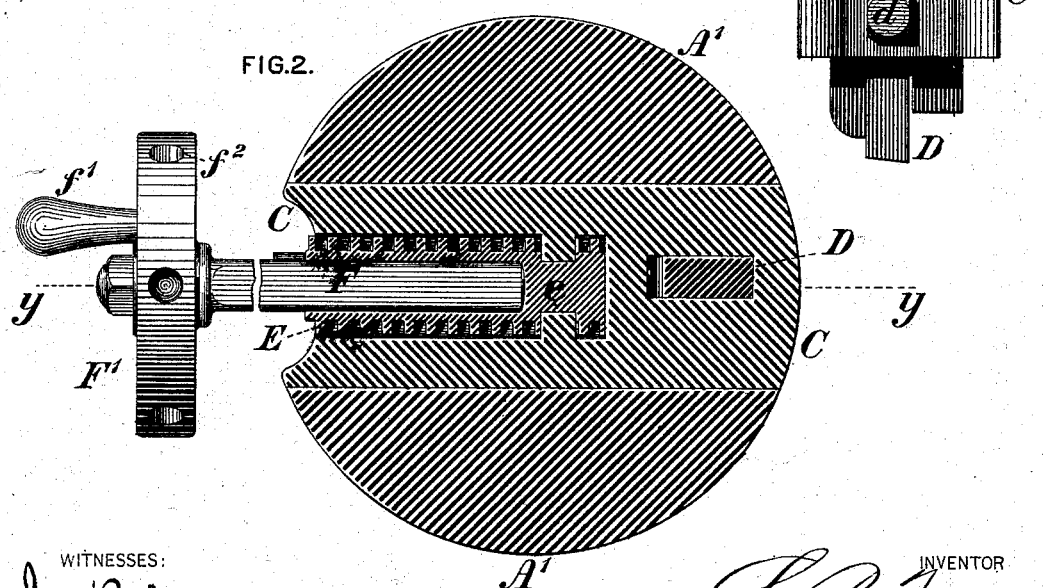

UNITED STATES PATENT OFFICE.

LUTHER R. FAUGHT, OF PHILADELPHIA, PENNSYLVANIA.

BORING-BAR.

SPECIFICATION forming part of Letters Patent No. 255,846, dated April 4, 1882.

Application filed January 20, 1882. (No model.)

*To all whom it may concern:*

Be it known that I, LUTHER R. FAUGHT, of the city and county of Philadelphia, in the State of Pennsylvania, have invented certain new and useful Improvements in Boring-Bars, of which improvements the following is a specification.

The object of my present invention (which is an improvement upon that for which Letters Patent of the United States No. 241,482 were granted and issued to me under date of May 17, 1881) is to simplify the construction and perfect the operation of the mechanism for feeding the tool-holder transversely to the axis of the boring-bar, to obviate the necessity of removing the feed-screw, and to admit of the rotation of the latter, either by hand or automatically, from a moving element of the machine, as may be preferred.

To these ends my improvements consist in the combination of a boring-bar having a transversely-slotted head or enlargement adjacent to one of its ends and a segmental female thread formed on one side of its slot or opening, a block or tool-holder adapted to receive a shouldering or facing tool and fitting in the slot of the boring-bar, a feed-screw fitting in a recess in the tool-holder and engaging the female thread of the boring-bar, and a squared stem or stock inserted removably in a central opening in the feed-screw and serving to impart rotation to the latter.

The improvements claimed are hereinafter more fully set forth.

In the accompanying drawings, Figure 1 is a longitudinal section through a portion of a boring-bar embodying my invention at the line $y\ y$ of Fig. 2; Fig. 2, a transverse section through the same at the line $x\ x$ of Fig. 1; and Fig. 3, an end view of the tool-holder detached, as seen from the left of Figs. 1 and 2.

The boring-bar A and tool-holder C are similar to those described and shown in my Letters Patent No. 241,482, aforesaid, in the following particulars: A cylindrical head or enlargement, A', the diameter of which is about equal to or slightly less than that of the spindle B, is formed upon the boring-bar adjacent to its junction with the spindle. The upper face of the head A' fits neatly against the lower end of the spindle, to which the bar is preferably connected by a threaded stem or prolongation, $a$, engaging a corresponding female thread in the spindle, which stem may either commence directly at the head A' or be connected thereto by a conical neck fitting a similar recess in the end of the spindle, as shown in Fig. 1. A diametric slot of rectangular cross-section is formed in the head A', and a steel block or tool-holder, C, of similar section, is fitted neatly to said slot, so as to slide easily therein in a plane perpendicular to the axis of the bar A, the length of said block being equal, as nearly as may be, to the diameter of the head A'. A vertical slot is formed in the block C near its longitudinal center line, to receive a vertical shouldering or facing tool or cutter, D—that is to say, a tool the lower cutting-edge of which is at right angles to the axis of the bar A—the inner face of said slot being substantially in line with the periphery of the bar when the block is entirely within the head, and its narrowest dimension, corresponding to the thickness of the tool, being transverse to the block. The metal of the block at and adjacent to the outer wall of the tool-slot is by preference prolonged downwardly, so as to form a lip or shoulder, $c$, to provide increased support for the cutter D, which is held firmly in position by a set screw, $d$, engaging a thread in the block, and bearing upon the tool in a direction parallel to the line of its cutting-edge. A recess, $c'$, is formed in the end of the block C farthest from the tool-slot, to receive the head of the set-screw $d$ and prevent the protrusion thereof beyond the circumference of the spindle, to admit of the latter, with the attached head and boring-bar, being drawn up into its box, when required, for the removal of the work from the table.

The transverse or outward feed of the tool-holder, by which the diameter of the cut is increased as required in the progress of the operation, is effected in the following manner: A segmental female screw-thread, $a'$, is cut upon the portion of the head A' which forms the upper boundary of the slot in which the tool-holder C is fitted, at right angles to the axis of the boring-bar, and a feed-screw, E, which rests in a semi cylindrical recess in the tool-holder and is retained in position longitudinally by a shoulder, $e$, therein, engages the thread $a'$, and serves thereby, when rotated, to impart longitudinal movement to the tool-holder. Rotation is imparted to the feed-screw by a removable stem, F, having squared sides, which fits in a central bore or socket, $f$, of corresponding section, formed in the feed-screw, and carries upon its outer end a hand-wheel, F', having a handle, $f'$, and sockets $f^2$, for the insertion of a longer operating-handle, if required. When an automatic feed is desired a ratchet-wheel may be substituted for the hand-wheel F', and a pawl, operated by proper connections from a rotating member of the boring-machine, will serve to impart to the ratchet-wheel the intermittent rotation requisite to perform the feed.

The stem F and feed-screw E constituting, when in operation, a single member, and the stem being removable as required, it will be seen that the feed mechanism is simplified to the extent of embracing but one moving part, and the stationary attachments heretofore used are dispensed with. Moreover, inasmuch as upon the withdrawal of the stem there is no protrusion of any portion of the tool-holder beyond the periphery of the spindle, the necessity heretofore existing of detaching the feed-screw and connections when the spindle is required to be drawn up into its box is avoided.

I claim as my invention and desire to secure by Letters Patent—

1. The combination, substantially as set forth, of a boring-bar having a transversely-slotted head or enlargement and a segmental female screw-thread formed on one side of its slot or opening, a block or tool-holder adapted to receive a shouldering or facing tool and fitting in a recess in the head of the bar, a feed-screw fitting in a recess in the tool-holder and engaging the female thread of the boring-bar, and a stem or stock fitting a socket in the feed-screw and serving to impart rotation thereto.

2. A tool-holder for boring-bars having a tool-slot adjacent to one of its ends, a semi-cylindrical recess at right angles to said slot for the reception of a feed-screw, and a collar projecting into said recess to retain the feed-screw in position longitudinally, substantially as set forth.

L. R. FAUGHT.

Witnesses:
J. SNOWDEN BELL,
GEO. T. KELLY.